United States Patent [19]

Jarman et al.

[11] Patent Number: 4,690,378

[45] Date of Patent: Sep. 1, 1987

[54] VEHICLE JACK

[75] Inventors: Davis R. Jarman, Hortense; Virgil H. Hinson, Brunswick, both of Ga.

[73] Assignee: Automotive Collision Tools, Inc., Brunswick, Ga.

[21] Appl. No.: 832,060

[22] Filed: Feb. 24, 1986

[51] Int. Cl.[4] .......... B60P 1/48

[52] U.S. Cl. .......... 254/8 B; 254/2 B

[58] Field of Search .......... 254/2-8 B, 254/2.8 B; 269/69

[56] References Cited

U.S. PATENT DOCUMENTS

| | | | |
|---|---|---|---|
| 2,610,025 | 9/1952 | Mueller | 254/2 B |
| 2,806,613 | 9/1957 | Johnson | 254/8 B |

FOREIGN PATENT DOCUMENTS

| | | | |
|---|---|---|---|
| 559029 | 6/1923 | France | 254/8 B |

*Primary Examiner*—Frederick R. Schmidt
*Assistant Examiner*—Judy J. Hartman
*Attorney, Agent, or Firm*—Harvey B. Jacobson

[57] ABSTRACT

An elongated main beam is provided with support wheels at its opposite ends and a parallelogram-type lift arm assembly is pivotally mounted from a first end of the main beam for swinging movement between a lowered substantially horizontal position closely overlying the central portion of the main beam and an inclined position in which a lifting head carried by the upper end of the lift arm assembly may be used to support one side of a vehicle in an elevated position. A slide or follower is mounted on the second end of the main beam and a fluid motor is operatively connected between the main beam and the slide for forcibly shifting the latter along the main beam toward the first end thereof. Force arm structure is pivotally connected between the follower and a midlength portion of the lift arm assembly and is operative to raise the lift arm assembly to a vehicle elevating position responsive to actuation of the fluid motor to force the follower along the main beam toward the first end thereof.

11 Claims, 9 Drawing Figures

VEHICLE JACK

BACKGROUND OF THE INVENTION

1. Field of the Invention

The invention relates to a jacking mechanism incorporating an elongated wheel supported horizontal main beam and fluid motor actuated parallel linkage lift arms pivotally supported from one end of the main beam.

2. Description of Related Art

Various different forms of vehicle jacks of the low silhouette type heretofore have been provided incorporating parallel linkage lift arms actuated by a fluid motor.

However, the vehicle jack of the instant invention includes a combination of structural features which particularly well adapt the vehicle jack to be utilized during various different vehicle repair operations.

SUMMARY OF THE INVENTION

The jack of the instant invention has been specifically designed for use in automobile repair operations and to lift an automobile or other motor vehicle from one side so as to lift or elevate that one vehicle side relative to the ground. The jack is highly mobile and is of low silhouette design whereby it may be used in conjunction with vehicles having low ground clearance. In addition, the jack has been specifically designed to be used in conjunction with vehicles of "uni-body" construction. Also, the jack is collapsible into a relatively small cross sectional area for compact storage.

The main object of this invention is to provide a vehicle jack specifically designed to facilitate lifting one side of a motor vehicle from the ground in a manner such that various vehicle repair operations may be carried out on the vehicle.

Another object of this invention is to provide a vehicle jack of the fluid motor actuated type.

Still another object of this invention is to provide a vehicle jack having a considerable range of lift.

Another important object of this invention is to provide a vehicle jack having a low silhouette.

Another object of this invention is to provide a jack incorporating a safety latching mechanism whereby the jack may be positively locked in selected elevated positions.

A further object of this invention is to provide a vehicle jack which may be compactly stored when in a collapsed state.

Yet another important object of this invention is to provide a vehicle jack upon which maintenance and repair operations may be readily carried out.

A final object of this invention to be specifically enumerated herein is to provide a vehicle jack in accordance with the preceding objects and which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
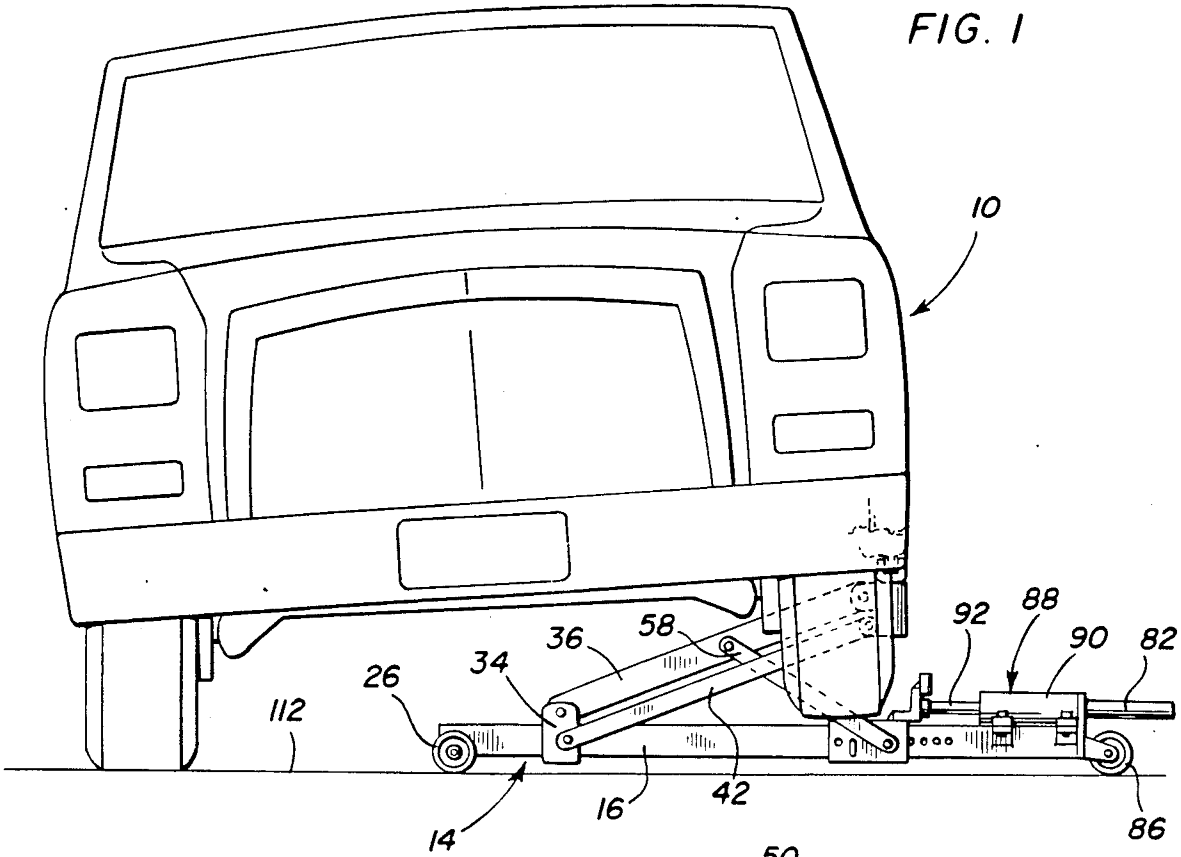
FIG. 1 is a front elevational view of a conventional form of passenger motor vehicle with the left side of the vehicle being supported in elevated position through the utilization of the jack of the instant invention.
Figure 2:
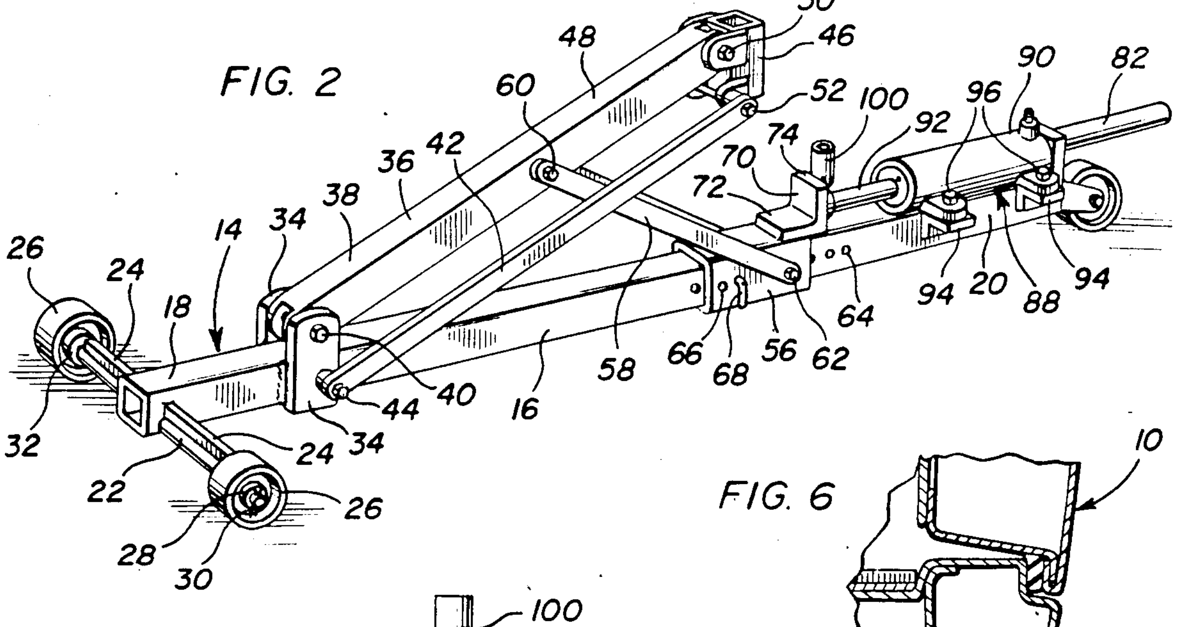
FIG. 2 is an enlarged perspective view of the jack illustrated in FIG. 1.
Figure 5:
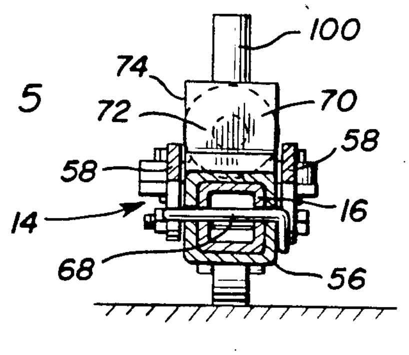
FIG. 5 is a fragmentary transverse vertical sectional view taken substantially upon the plane indicated by the section line 5—5 of FIG. 4.

Referring now more specifically to the drawings the numeral 10 generally designates a conventional form of passenger motor vehicle of the "uni-body" type including at least one "pinch area" 12 with which a jack may be engaged for lifting the corresponding side of the vehicle 10 relative to the ground.

The jack of the instant invention is generally referred to by the reference numeral 14 and includes an elongated, horizontal and tubular main beam member 16 having first and second ends 18 and 20. The first end 18 supports a low, horizontal and a transversely extending axle member 22 which projects considerably outward from the opposite sides of the main beam member 16. The opposite side outwardly projecting ends of the axle member are reinforced by bar members 24 extending along and welded to the upper surface portions of the opposite ends of the axle member and also to the corresponding sides of the main beam member 16. The bars 24 terminate outward a spaced distance from the outer ends of the axle member 22 and the axle member outer ends include wheels 26 journalled thereon and retained against removal from the terminal ends of the axle member 22 by washers 28 and cotter pins 30. In addition, washers 32 are mounted on the axle member ends immediately inward of the wheels 26 and outward of the outer ends of the corresponding bars 24.

The first end 18 of the main beam member 16 includes a pair of opposite side upwardly projecting mounting flanges 34 welded thereto and projecting upwardly above the main beam member 16. An upper tubular lift arm 36 is pivotally mounted at a first end 38 thereof between the upper ends of the flanges 34 immediately above the main beam member 16 by a suitable pivot fastener 40 and a pair of opposite side lower lift arms 42 have first ends pivotally anchored to the lower portions of corresponding flanges 34 as at 44 with the lower lift arms 42 disposed on opposite sides of the main beam member 16.

An upright tubular support 46 is pivotally anchored at its upper end to the second end 48 of the upper lift arm 36 as at 50 and pivotally attached at its lower end to the corresponding ends of the lower lift arms 42 as at 52. The arms 36 and 42 comprise parallel arms.

A tubular follower or sleeve 56 is slidably mounted on the tubular main beam member 16 for guided movement therealong and a pair of parallel force arms 58 have one pair of corresponding ends pivotally anchored to opposite side longitudinal mid-portions of the lift arm 36 as at 60 and the other pair of corresponding ends of the force arms of 58 are pivotally anchored to opposite side portions of the follower 56 as at 62. Further, the main beam member 16 includes longitudinally spaced transverse bores 64 formed therethrough and the sleeve 56 includes longitudinally spaced transverse bores 66 formed therethrough which are selectively registrable with the bores 64, a lock pin 68 being removably insertable through selected bores 64 and 66 to positively lock the sleeve or follower 56 in adjusted position along the main beam member 16.

The end of the follower 56 adjacent the second end 20 of the longitudinal beam member 16 includes an L-shaped bracket 70 supported therefrom including a horizontal flange 72 welded to the sleeve 56 and a vertical flange 74 facing toward the second end 20 of the main beam member 16. The side of the vertical flange 74 facing the second end 20 of the main beam member 16 includes a vertical ring 76 secured thereto by welding and defining a horizontally outwardly opening pocket 78 facing toward the second end 20 of the main beam member 16. The second end 20 includes an upstanding mounting plate welded thereto equipped with a horizontally outwardly projecting elongated handle 82 projecting away from the first end 18 of the main beam member 16. In addition, a pair of upstanding laterally spaced wheel support flanges 84 are supported from and project outwardly from the mounting plate 80 and journal a single wheel 86 therebetween corresponding to the wheels 26.

A fluid motor 88 including a stationary cylinder portion 90 and an extendable piston rod portion 92 extends longitudinally along the upper surface of the second end 20 of the main beam member 16 and includes opposite side mounting lugs 92 secured to corresponding mounting flanges 94 carried by and spaced longitudinally along opposite sides of the main beam member 16. Suitable fasteners 96 are secured through the mounting lugs 92 and the mounting flanges 94.

The free end of the piston rod portion 92 is received within the pocket 78 and the cylinder portion 90 includes a fluid pressure inlet 98 by which fluid pressure may be admitted to the interior of the cylinder portion 90 in order to effect longitudinal extension of the piston rod portion 92 and thus movement of the sleeve or follower 56 along the main beam member 16 towsrd the first end 18 thereof. In addition, the bracket 70 includes an upstanding tubular receptacle 100 supported therefrom in which the pin 68 may be stored during periods of non-use.

Figure 6:
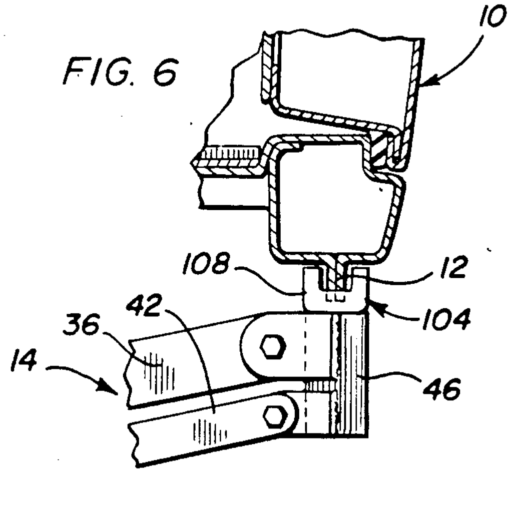
FIG. 6 is a fragmentary enlarged vertical sectional view illustrating the manner in which the jack may engage a predetermined "pinch area" of a vehicle of uni-body construction for the purpose of elevating one side of the vehicle.
Figure 8:
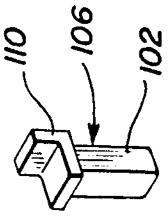
FIGS. 7 and 8 are perspective views of alternate lifting heads which may be used on the jack.
Figure 7:
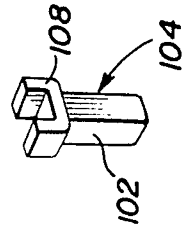

The tubular upright support 46 may selectively receive the depending shank portions 102 of a pair of lifting heads referred to in general by the reference numerals 104 and 106, see FIGS. 7 and 8. The upper end of the shank 102 of the lifting head 104 includes a U-shaped work engaging element 108, see FIGS. 6 and 7 and the upper end of the shank 102 of the head 106 includes an L-shaped work engaging element 110. The work engaging elements 108 and 110 are adapted to engage "pinch areas" such as the "pinch area" 12.

From FIG. 1 of the drawings it may be seen that the jack 14 may be rolled beneath one side of the vehicle 10 and actuated to lift that side of the vehicle 10 relative to the support surface 112 from which the jack 14 is supported. When the vehicle 10 has been elevated to the position desired, the pin 68 is inserted in the corresponding sets of apertures or bores 64 and 66.

Figure 9:
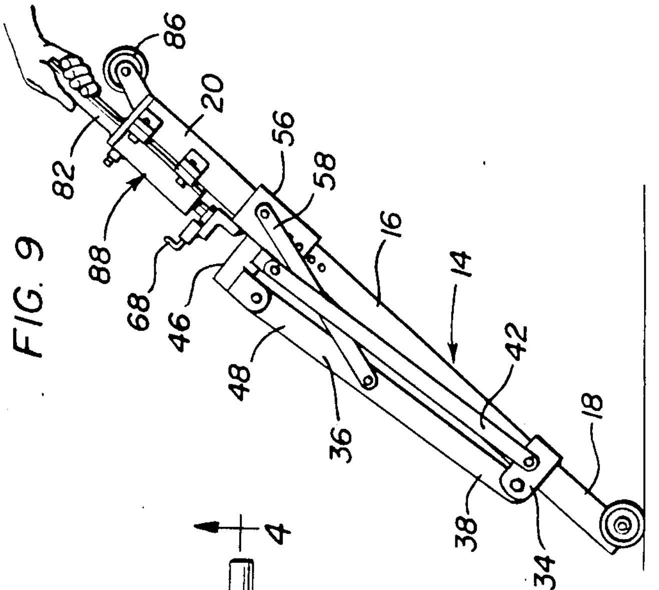
FIG. 9 is a side elevational view of the jack in a fully collapsed position and with the handle end thereof elevated above the ground for moving the jack from one location to another preparatory to elevating one side of an associated vehicle.
Figure 3:
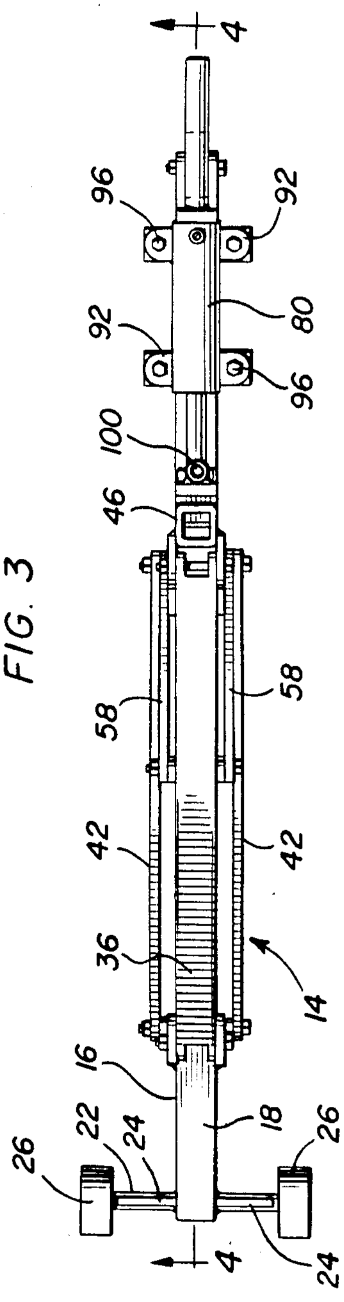
FIG. 3 is a top plan view of the jack.
Figure 4:
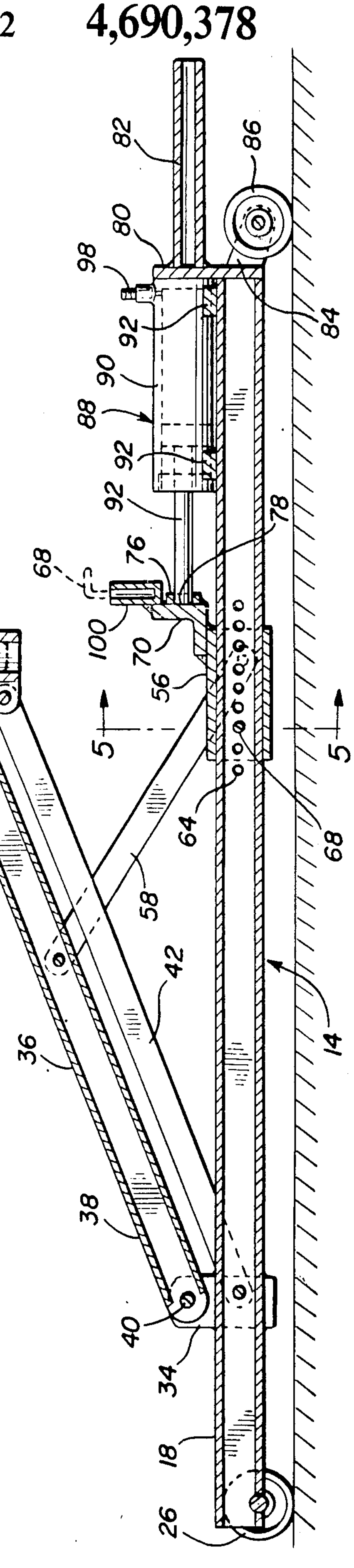
FIG. 4 is an enlarged longitudinal vertical sectional view taken substantially upon the plane indicated by the section line 4—4 of FIG. 3.

As may be seen from FIG. 9 of the drawings the jack 14 may be collapsed to a compact state with the lower end of the upright tubular support 46 abutted against a mid-length portion of the sleeve or follower 56. Thereafter, the second end 20 of the main beam member 16 may be raised by gripping the handle 82 and lifting upwardly on the latter. When the jack 14 is in the inclined position illustrated in FIG. 9 it may be readily rolled to a point of use and positioned preparatory to lift the vehicle 10 in the manner illustrated in FIG. 1.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A vehicle jack including an elongated horizontal main beam member having first and second ends, first and second support wheel means journalled from said first and second ends for rolling support of said main beam member from a horizontal support surface with said beam member slightly spaced above said surface, a follower mounted on said main beam member for guided reciprocal movement longitudinally therealong generally centrally intermediate said ends, upper and lower, elongated and parallel lift arm means including corresponding first and second ends, means pivotally mounting said first ends from said first end of said beam member for angular displacement relative thereto about first horizontal upper and lower axes, respectively, extending transversely of said beam member and lift arm means, an upright support, means pivotally securing the second ends of said upper and lower lift arm means to upper and lower portions, respectively, of said upright support for relative angular displacement of said upright support and upper and lower arm means about second horizontal upper and lower axes, elongated thrust arm means including first and second ends pivotally secured to a longitudinal midportion of said upper lift arm means and said follower, respectively, for angular displacement relative thereto about axes paralleling said first and second upper and lower axes, anchor means carried by said follower and projecting upwardly therefrom to an elevation spaced above said beam member, and elongated, longitudinally extendable fluid motor means carried by and extending along said beam member second end on the side of said follower remote from said first end of said beam member and including a mounted base portion anchored relative to said beam member and an extendable portion engaged with said anchor means to force said anchor means and follower along said beam member toward said first end of said beam member responsive to longitudinal extension of said fluid motor, said beam member comprising a tubular member and said follower comprising a sleeve slidably mounted on said tube member, and a latch means including selectively registerable transverse bores in and spaced longitudinally of said tube and follower sleeve and a pin removably receivable through selectively registered bores.

2. The jack of claim 1 wherein said lower lift arm means includes a pair of lower arms and said upper lift arm means includes a single lift arm disposed in a vertical plane passing centrally longitudinally of said beam member and on whose opposite sides said pair of lower arms are disposed.

3. The jack of claim 2 wherein said first end of said beam member includes opposite side upwardly projecting flanges between which the first end of said single upper arm is pivotally anchored.

4. The jack of claim 1 wherein said thrust arm means includes a pair of opposite side force arms extending between and pivotally anchored relative to opposite side portions of said sleeve and opposite side portions of said upper lift arm intermediate the opposite ends thereof.

5. The jack of claim 4 wherein said upright support comprises an upstanding tubular member whose lower end abuts the upper portion of said sleeve when said jack is in a collapsed position.

6. The jack of claim 5 including a horizontally outwardly projecting handle carried by said second end of said beam member.

7. The jack of claim 5 wherein said support wheel means carried by said first end of said beam member includes a horizontal transverse axle mounted from said first end of said beam member and projecting outwardly from opposite sides thereof, the free ends of said axle member having wheels journalled thereon, the outwardly projecting opposite end portions of said axle member including reinforcing bars welded to the upper surfaces of said opposite end portions and to the corresponding sides of said beam member.

8. The jack of claim 7 wherein said support wheel means carried by said second end of said beam member comprises a single central wheel.

9. The jack of claim 5 wherein said upstanding tubular member includes a lifting head supported therefrom incorporating a shank portion downwardly telescoped into said upright tubular support.

10. The jack of claim 9 wherein said lifting head comprises an upwardly opening U-shaped channel member.

11. The jack of claim 9 wherein said lifting head comprises an L-shaped lifting member.

* * * * *